(12) United States Patent
Jiang et al.

(10) Patent No.: US 10,421,460 B2
(45) Date of Patent: Sep. 24, 2019

(54) EVALUATION FRAMEWORK FOR DECISION MAKING OF AUTONOMOUS DRIVING VEHICLE

(71) Applicant: Baidu USA LLC, Sunnyvale, CA (US)

(72) Inventors: Yifei Jiang, Sunnyvale, CA (US); Dong Li, Sunnyvale, CA (US); Jiaming Tao, Sunnyvale, CA (US); Jiangtao Hu, Sunnyvale, CA (US); Liyun Li, Sunnyvale, CA (US); Guang Yang, Sunnyvale, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 236 days.

(21) Appl. No.: 15/347,659

(22) Filed: Nov. 9, 2016

(65) Prior Publication Data

US 2018/0127000 A1 May 10, 2018

(51) Int. Cl.
*B60W 40/09* (2012.01)
*G06N 20/00* (2019.01)
*G06F 16/22* (2019.01)
*G06F 16/23* (2019.01)
*B60W 50/04* (2006.01)
(Continued)

(52) U.S. Cl.
CPC .......... *B60W 40/09* (2013.01); *B60W 50/045* (2013.01); *G05D 1/0061* (2013.01); *G05D 1/0088* (2013.01); *G05D 1/021* (2013.01); *G06F 16/22* (2019.01); *G06F 16/2358* (2019.01); *G06N 20/00* (2019.01);
(Continued)

(58) Field of Classification Search
CPC . B60W 2050/0088; B60W 2050/0089; B60W 40/09; B60W 50/045; G05D 1/0061; G05D 1/021; G05D 1/0221; G05D 1/0088; G05D 1/0081; G05D 2201/0213; G06F 17/30312; G06F 17/30368; G06F 16/22; G06F 16/2358; G06N 99/005; G06N 20/00
USPC .......................................................... 701/23
See application file for complete search history.

(56) References Cited

U.S. PATENT DOCUMENTS

| | | | |
|---|---|---|---|
| 6,360,193 B1 * | 3/2002 | Stoyen | G09B 9/003 |
| | | | 703/17 |
| 8,670,891 B1 * | 3/2014 | Szybalski | B62D 1/286 |
| | | | 701/23 |

(Continued)

*Primary Examiner* — Angelina Shudy
(74) *Attorney, Agent, or Firm* — Womble Bond Dickinson (US) LLP

(57) ABSTRACT

In one embodiment, systems and methods are disclosed for evaluating autonomous driving vehicle (ADV) driving decisions. A driving scenario is selected, such as a route or destination or type of driving condition. ADV planning and control modules are turned off and do not control the ADV. As a user drives the ADV, sensors detect and periodically log a plurality of objects external to the ADV. Driving control inputs of the human driver are also logged periodically. An ADV driving decision module generates driving decisions with respect to each object detected by the sensors. The ADV driving decisions are logged, but are not used to control the ADV. An ADV driving decision is identified in the logs, and a corresponding human driving decision is extracted, graded, and compared to the ADV driving decision. The ADV driving decision can be graded using the logs and graded human driving decision.

27 Claims, 10 Drawing Sheets

(51) Int. Cl.
  *G05D 1/02* (2006.01)
  *G05D 1/00* (2006.01)
  *B60W 50/00* (2006.01)

(52) U.S. Cl.
  CPC .............. *B60W 2050/0088* (2013.01); *B60W 2050/0089* (2013.01); *G05D 2201/0213* (2013.01)

(56) References Cited

U.S. PATENT DOCUMENTS

| | | | | |
|---|---|---|---|---|
| 8,965,621 | B1* | 2/2015 | Urmson | G06T 7/223 701/23 |
| 9,008,890 | B1* | 4/2015 | Herbach | B60W 30/00 701/26 |
| 9,014,905 | B1* | 4/2015 | Kretzschmar | G05D 1/021 701/28 |
| 9,189,897 | B1* | 11/2015 | Stenneth | G07C 5/008 |
| 9,494,439 | B1* | 11/2016 | Ross | B60W 50/029 |
| 9,650,051 | B2 | 5/2017 | Hoye | B60W 40/09 |
| 9,815,481 | B2* | 11/2017 | Goldman-Shenhar | B60K 35/00 |
| 9,940,676 | B1* | 4/2018 | Biemer | G06Q 40/08 |
| 10,002,471 | B2* | 6/2018 | Blayvas | G01C 21/3453 |
| 10,013,893 | B2* | 7/2018 | Harkness | G09B 9/052 |
| 10,029,697 | B1* | 7/2018 | MacDonald | B60W 40/09 |
| 10,032,111 | B1* | 7/2018 | Bertram | G09B 9/16 |
| 10,093,322 | B2* | 10/2018 | Gordon | B60W 50/0097 |
| 2006/0225710 | A1* | 10/2006 | Taglialatela-Scafati | F02D 35/023 123/486 |
| 2008/0221892 | A1* | 9/2008 | Nathan | G06F 17/279 704/257 |
| 2009/0005929 | A1* | 1/2009 | Nakao | B60T 7/22 701/33.4 |
| 2010/0209888 | A1* | 8/2010 | Huang | B60W 40/09 434/65 |
| 2010/0209889 | A1* | 8/2010 | Huang | B60W 40/09 434/65 |
| 2012/0083947 | A1* | 4/2012 | Anderson | B60W 30/09 701/3 |
| 2014/0107912 | A1* | 4/2014 | Yucel | G07C 5/085 701/123 |
| 2014/0214260 | A1* | 7/2014 | Eckert | B60Q 1/488 701/28 |
| 2014/0244096 | A1* | 8/2014 | An | G05D 1/0055 701/25 |
| 2014/0330479 | A1* | 11/2014 | Dolgov | B60W 30/16 701/28 |
| 2015/0120142 | A1* | 4/2015 | Park | B62D 6/10 701/41 |
| 2015/0160019 | A1* | 6/2015 | Biswal | G01C 21/26 701/1 |
| 2015/0166059 | A1* | 6/2015 | Ko | B60W 30/09 701/28 |
| 2015/0166069 | A1* | 6/2015 | Engelman | B60W 30/12 701/23 |
| 2015/0175168 | A1* | 6/2015 | Hoye | B60W 40/09 434/64 |
| 2015/0375757 | A1* | 12/2015 | Schiek | B60W 50/14 701/23 |
| 2016/0026182 | A1* | 1/2016 | Boroditsky | H04L 67/306 701/23 |
| 2016/0129787 | A1* | 5/2016 | Netzer | B60K 35/00 701/36 |
| 2016/0252903 | A1* | 9/2016 | Prokhorov | B60W 30/143 701/23 |
| 2016/0375912 | A1* | 12/2016 | Christensen | B60W 50/0097 701/25 |
| 2017/0003681 | A1* | 1/2017 | Ross | B60W 50/029 |
| 2017/0010613 | A1* | 1/2017 | Fukumoto | G08G 1/096827 |
| 2017/0039871 | A1* | 2/2017 | Harkness | G09B 9/052 |
| 2017/0088143 | A1* | 3/2017 | Goldman-Shenhar | B60K 35/00 |
| 2017/0090478 | A1* | 3/2017 | Blayvas | G01C 21/3453 |
| 2017/0166222 | A1* | 6/2017 | James | B60W 50/14 |
| 2017/0210388 | A1* | 7/2017 | Wieskamp | G07C 5/0808 |
| 2017/0285639 | A1* | 10/2017 | Jones | B60W 30/08 |
| 2017/0369052 | A1* | 12/2017 | Nagy | B60W 50/08 |
| 2018/0001901 | A1* | 1/2018 | Durney | B60W 50/10 |
| 2018/0032082 | A1* | 2/2018 | Shalev-Shwartz | B60W 30/09 |
| 2018/0061237 | A1* | 3/2018 | Erickson | G08G 1/163 |
| 2018/0074493 | A1* | 3/2018 | Prokhorov | G05D 1/0088 |
| 2018/0118219 | A1* | 5/2018 | Hiei | B60W 40/09 |
| 2018/0136652 | A1* | 5/2018 | Jiang | G05D 1/0088 |
| 2018/0141568 | A1* | 5/2018 | Singhal | G01S 13/862 |
| 2018/0164825 | A1* | 6/2018 | Matus | B60W 30/00 |
| 2018/0189681 | A1* | 7/2018 | Harrivel | A63F 13/42 |
| 2018/0201273 | A1* | 7/2018 | Xiao | B60W 40/09 |
| 2018/0208206 | A1* | 7/2018 | Petrucci | B60R 16/0231 |
| 2018/0237027 | A1* | 8/2018 | Lundsgaard | B60W 50/0098 |
| 2018/0261023 | A1* | 9/2018 | Blayvas | G06Q 10/04 |
| 2019/0064805 | A1* | 2/2019 | Frazzoli | G05D 1/0061 |
| 2019/0113918 | A1* | 4/2019 | Englard | G01C 21/3492 |
| 2019/0113927 | A1* | 4/2019 | Englard | G01C 21/3492 |

* cited by examiner

Perception Log 800

| Object | Description | t0 | | | t1 | | | t2 | | |
|---|---|---|---|---|---|---|---|---|---|---|
| | | Speed Mph | Location θ, feet | Orientation | Speed Mph | Location θ, feet | Orientation | Speed mph | Location θ, feet | Orientation |
| 101 | ADV | 26 | 0°, 0.0' | | 15 mph | 0°, 0.0' | | 0 | 0°, 0.0' | |
| 510 | Car | 25 | -75°, 101' | ↑ | 23 mph | -68°, 81' | ↑ | 21 | -62°, 63' | ↑ |
| 511 | House | 0 | -28°, 111' | - | 0 mph | -29°, 99' | - | 0 | -30°, 92' | - |
| 512 | Man/dog | 3 | +36°, 40' | ↓ | 2.5 mph | +32°, 32' | ↓ | 3.5 | +27°, 38' | ↓ |
| 513 | Crosswalk | 0 | 0°, 15' | - | 0 mph | 0°, 8' | - | 0 | 0°, 1' | - |
| 514 | Lane, Left | 0 | -90°, 3' | - | 0 mph | -90°, 3' | - | 0 | -90°, 3' | - |
| 515 | Lane, Right | 0 | +90°, 4' | - | 0 mph | +90°, 4' | - | 0 | +90°, 4' | - |
| ... | | | | | | | | | | |

FIG. 8A

Driving Log 805

| Driving Attribute | t0 | t1 | t2 |
|---|---|---|---|
| Speed - mph | 26 | 15 | 0 |
| Location - GPS | N 37° 44' 42.05", W 122° 26' 18.05" | N 37° 44' 42.18", W 122° 26' 18.06" | N 37° 44' 42.32", W 122° 26' 18.07" |
| Orientation | North + 3.5° | North + 3.5° | North + 3.5° |
| Accelerator input | 5% | 0% | 0% |
| Brake input | 0% | 10% | 50% |
| Steering input | 0° | 0° | 0° |

FIG. 8B

ADV Driving Decision Log 810

| Object | Description | t0 | t1 | t2 |
|---|---|---|---|---|
| 510 | Car | Overtake | Yield | Stop |
| 511 | House | Ignore | Ignore | Ignore |
| 512 | Man/dog | Overtake | Stop | Stop |
| 513 | Crosswalk | Overtake | Stop | Stop |
| ... | | | | |

FIG. 8C

Scoring of Driving Decision for Object 510 Car at time t0 815

| Score factor | Score basis | Human decision Score Decision = Yield | ADV decision score Decision = Overtake |
|---|---|---|---|
| 820 Safety | Distance to other objects, ADV moving | 1.00 | 0.70 |
| 825 Passenger Comfort | Acceleration: right/left, front/back | 0.80 | 0.75 |
| 830 Rule compliance | Count of rule violations: serious/minor | 1.00 | 0.75 |
| 835 Time efficiency | Time spent in each segment of scenario | 0.30 | 1.00 |

FIG. 8D

EVALUATION FRAMEWORK FOR DECISION MAKING OF AUTONOMOUS DRIVING VEHICLE

TECHNICAL FIELD

Embodiments of the present invention relate generally to operating autonomous vehicles. More particularly, embodiments of the invention relate to evaluating driving decisions made by an autonomous vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. To human drivers, planning and control of a vehicle is a subjective decision-making process. Two different human drivers, faced with identical driving situations, are likely to make different planning and control decisions for the driving situation. Autonomous vehicle driving decisions are objective and should produce the same driving decision under the same driving situations. An evaluation framework is needed to account for differences between objective autonomous vehicle driving decisions and subjective human decisions, for the same driving situation.

BRIEF DESCRIPTION OF THE DRAWINGS

Embodiments of the invention are illustrated by way of example and not limitation in the figures of the accompanying drawings in which like references indicate similar elements.

FIG. 8A illustrates an example perception log, according to some embodiments.

FIG. 8B illustrates an example driving log, according to some embodiments.

FIG. 8C illustrates an example ADV driving decision log, according to some embodiments.

FIG. 8D illustrates scoring of a human driving decision with reference to an object at a particular time, according to some embodiments.

DETAILED DESCRIPTION

Figure 1:
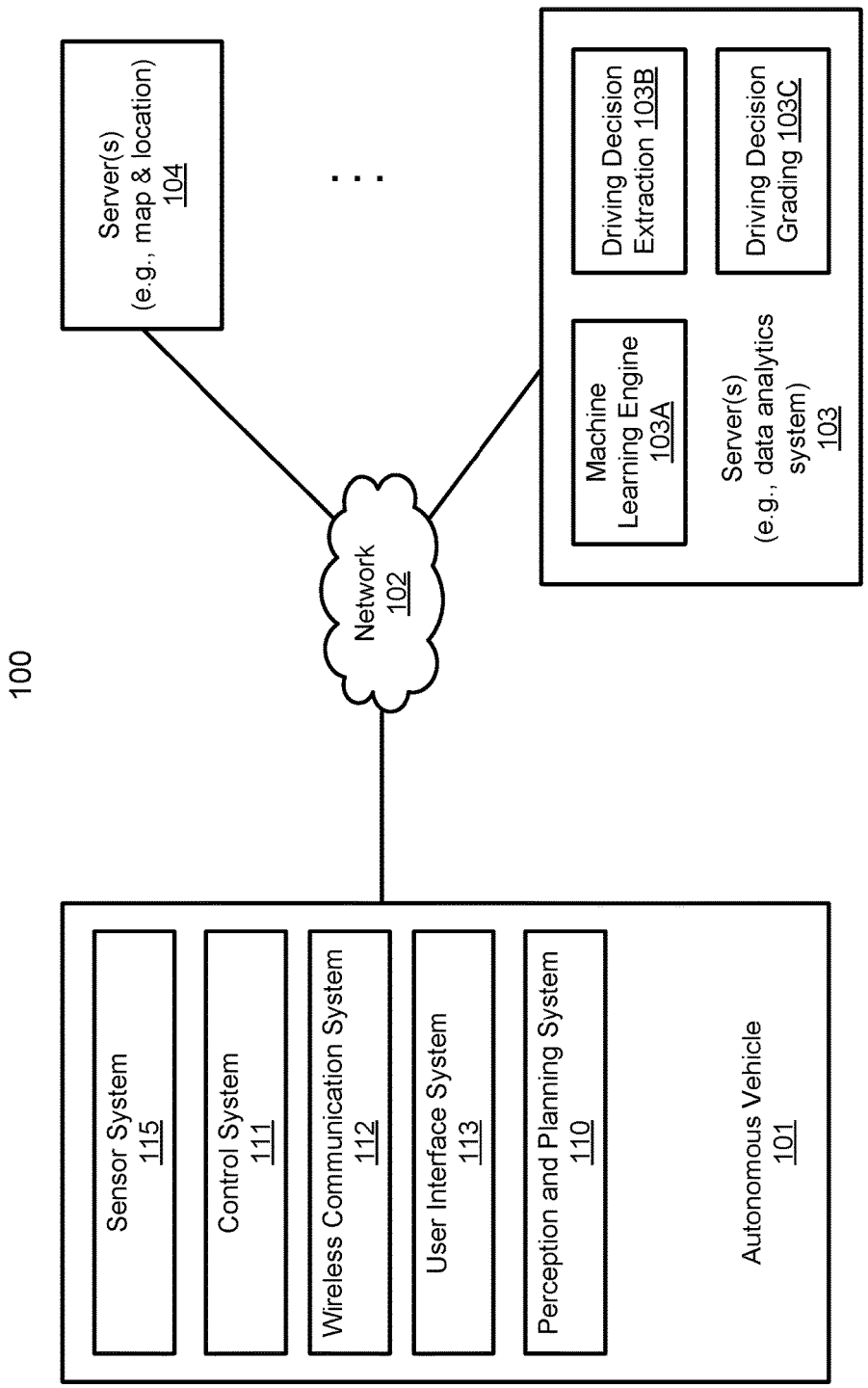
FIG. 1 is a block diagram illustrating an overview of a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, an autonomous vehicle can be configured to turn off autonomous driving planning and control functionality, so that a human driver can operate the autonomous vehicle. A driving scenario can be selected, such as a route, a destination, or a type of traffic (e.g. freeway, or city driving). As the autonomous vehicle is operated, by a human driver or by ADV logic, a variety of sensors can detect the location, distance, speed, and orientation of objects outside the autonomous vehicle. The sensor outputs can be periodically logged in a perception log. In an embodiment, the sensor outputs can be processed before logging. Driving control inputs, such as use of the steering wheel, accelerator, and brakes by the driver, can also be periodically recorded in a driving log. An autonomous vehicle driving decision module can generate driving decisions in response to the sensor outputs and control inputs. In an embodiment, the driving decisions can be generated logged in an ADV driving decision log, but are not executed autonomously, because the planning and control functionality is turned off. After the driving is ended, logging of sensor outputs, control inputs, and autonomous vehicle driving decisions can end. In an embodiment, the perception log, driving log, and ADV driving decision log can be uploaded to a server for analysis.

In another embodiment, a data analytics system can extract and grade the human driving decisions using the uploaded perception log, driving log, and ADV driving decision log. An autonomous driving vehicle (ADV) driving decision log can contain a log of a driving decision made for each of a plurality of objects detected by the one or more sensors of the ADV. However, when the ADV planning and control modules are turned off, the ADV driving decision is not executed, and thus the results of the ADV driving decision cannot be directly graded using the perception log and ADV driving decision. Also, when a human drives the ADV, the human driver makes driving decisions in her head. Thus, there is no log of a human driving decision with respect to objects in the perception logs. However, a human driving decision can be inferred and graded from the ADV driving decision logs, perception logs and driving logs. A human driving decision will often be made at about the same time that an ADV decision is made. In an embodiment, a human driving decision may lag behind an ADV driving decision by a reasonably predictable human reaction time, such as 0.75 seconds. Thus, a human driving decision to be graded may be extracted using the ADV driving decision log, the perception log, and the driving control input log.

An ADV driving decision can be identified in the ADV driving decision log. The perception log and driving logs, before and after the identified ADV driving decision, can be examined to detect the speed, distance, and orientation of one or more objects near the ADV, and any driving control inputs responsive to those objects. From this information, a human driving decision with respect to an object can be extracted. Perception logs and driving logs after the human driving decision can further be analyzed to grade the human driving decision. For example, it can be determined from the perception log whether a horn honked, whether the ADV was unsafely close to an object, such as a car or a person, whether the driver caused the ADV to run a yellow light, stop abruptly, or swerve out of the driving lane to avoid an object. In an embodiment, the human driving decision can be graded based upon metrics, such as comfort of passengers, safety of a decision, compliance with driving rules, and time efficiency. The graded human driving decision can be compared against the ADV driving decision. The graded human driving decision, perception logs, and driving logs can be used to determine a grade for the ADV driving decision.

FIG. 1 is a block diagram illustrating an autonomous driving vehicle network configuration 100 according to one embodiment of the invention. Referring to FIG. 1, network configuration 100 includes autonomous vehicle 101 that may be communicatively coupled to one or more servers 103-104 over a network 102. Although there is one autonomous vehicle 101 shown, multiple autonomous vehicles can be coupled to each other and/or coupled to servers 103-104 over network 102. Network 102 may be any type of network such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc. An example server system is described below with reference to FIG. 9.

An autonomous vehicle 101 refers to a vehicle that can be configured in an autonomous mode in which the vehicle navigates through an environment with little or no control input from a driver. Such an autonomous vehicle 101 can include a sensor system 115 having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Server 103 can include a data analytics system that includes a machine learning engine 103A, a driving decision extraction module 103B, and a driving decision grading module 103C. Each such module can be implemented in software, hardware, or a combination thereof. In an embodiment, modules 103A, 103B, and 103C comprise at least one hardware processor. Driving decision extraction 103B and driving decision extraction module 103C functionality are described below with reference to FIGS. 4, 7, and 8D.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
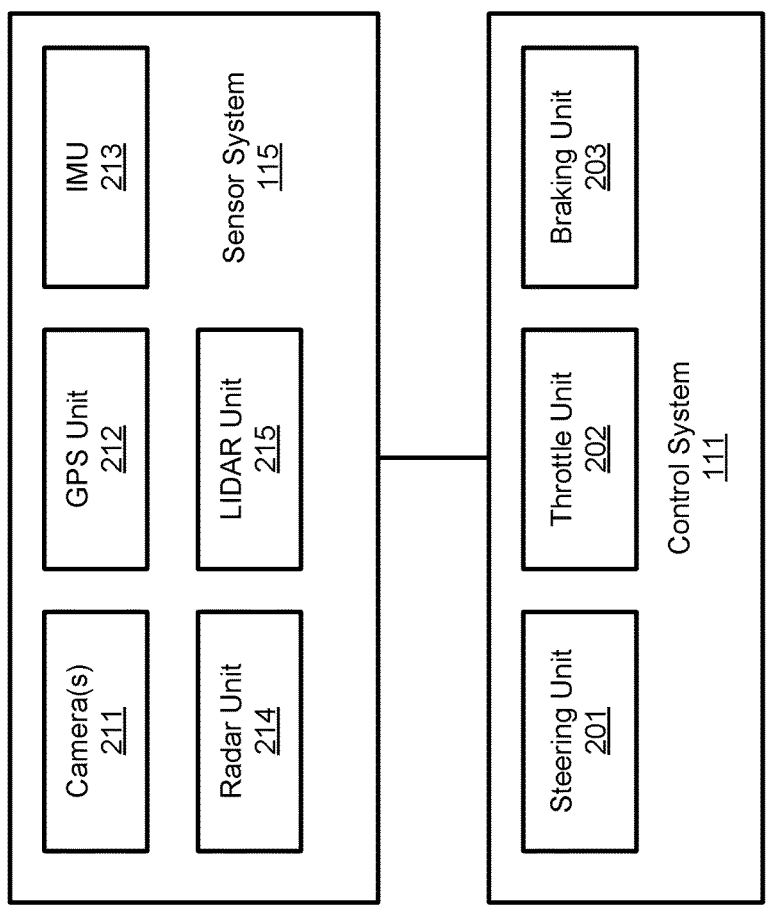
FIG. 2 is a block diagram illustrating an example of an autonomous driving vehicle (ADV) sensor and control module, according to one embodiment of the invention.

FIG. 2 is a block diagram illustrating an example of an autonomous vehicle 101 (AV) sensor and control module, according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle 101. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor. The throttle sensor, steering sensor, and braking sensor output values can be logged in a driving control input log. The sensors that monitor external objects, and speed, position, and orientation of the autonomous vehicle can be recorded in a sensor output log, or "perception" log.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111. In an embodiment, a planning portion of the perception and planning module 110 can be turned off. In an embodiment, control system 111 can be turned off. The autonomous vehicle 101 can be driven by a human driver while the planning and control modules are turned off.

For example, a user as a passenger may specify a starting location and a destination of a trip, for example, via a user interface 113. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

In an autonomous vehicle 101, there may be no actual or physical window. Rather, a "window" (referred to herein as a virtual window) may be represented or replaced by a display device, i.e., a flat or curved screen display device molded into a shape of a vehicle window, optionally with a touch screen. The display device would display images or stream of images (e.g., video) that are captured dynamically in real-time by an appropriate camera or cameras, as if the user were watching or viewing the actual physical content through a see-through window. For each of the "windows" (e.g., display devices), there can be a corresponding display channel to stream the corresponding content to be displayed at real-time, which may be centrally processed by an augmenting reality system, e.g., data processing system 110. In such situation, an augmented image is displayed in a virtual reality manner via data processing system 110, also referred to as an augmented reality manner.

In embodiments described herein, outputs from each sensor in the sensor system 115 can be logged while the autonomous vehicle 101 is driven by a human driver, with the planning an control modules turned off. Inputs to components of the control system 111 can be provided by the human driver. As the human drives the autonomous vehicle 101, the human inputs into the steering unit 201, throttle unit 202, and braking unit 203 can be logged into a "driving log" that captures actions taken by the human driver. The sensor log(s) and driving log(s) can be uploaded to server 103. In an embodiment, the sensor and driving log(s) are uploaded in real-time, or near real-time.

Figure 3:
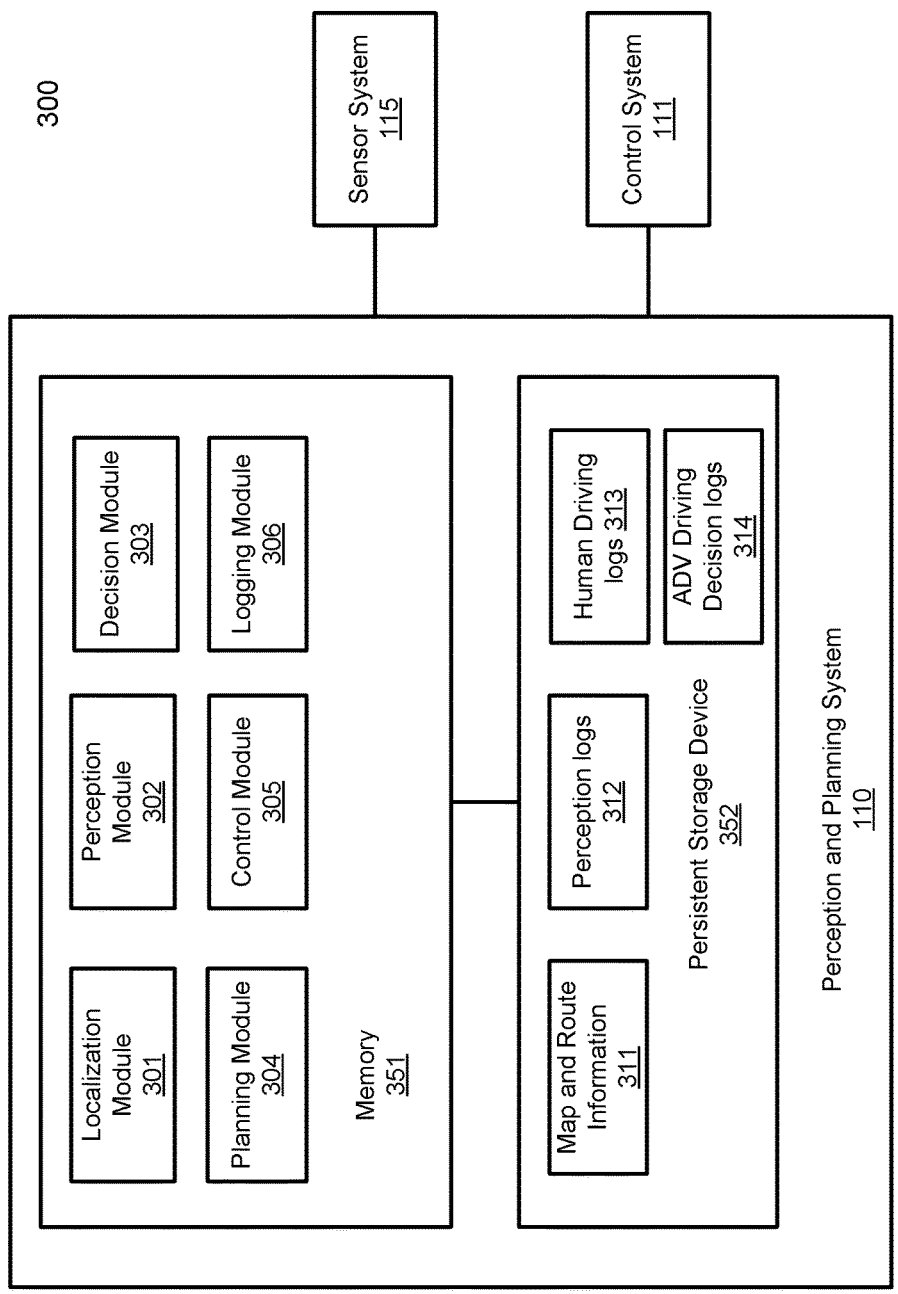
FIG. 3 is a block diagram illustrating an example of an ADV perception and planning system, according to one embodiment of the invention.

FIG. 3 is a block diagram 300 illustrating an example of a perception and planning system 110 used with an autonomous vehicle 101 according to one embodiment of the invention. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, decision module 303, planning module 304, control module 305, and logging module 306.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 can make a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules (not shown), which may be stored in persistent storage device 352.

Based on a decision for each of the objects perceived, planning module 304 plans a path or route for the autonomous vehicle 101, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the autonomous vehicle 101 from a first point to a second point of a route or path using appropriate vehicle settings or driving parameters (e.g., throttle, braking, and turning commands) at different points in time along the path or route.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Logging module 306 can receive data from perception module 302, ADV decisions from decision module 303, and control system inputs from control system 111. In an embodiment, control inputs from control system 111 are available, alternatively or in addition, from control module 305. Logging module 306 can receive perception data of objects sensed by sensor system 115 via perception module 302. In an embodiment, perception module 302 can process one or more sensor outputs from sensor system 115, before passing perception information to logging module 306. For example, perception module 302 can determine a location of an object by combining a distance determined by LIDAR with an orientation determined by GPS or RADAR. A location of the object can be passed by perception module 302 to logging module 306 for logging in the perception log, rather than storing raw sensor data. Logging module 306 can write perception log data to perception logs 312 and write human driving control inputs to human driving logs 313 on persistent storage 352 in ADV 101.

Logging module 306 can receive driving control inputs from control system 111. Driving control inputs can include braking input amount from braking unit 203, steering input amount from steering unit 201, and throttle input amount from throttle unit 202. In an embodiment, these inputs are responsive to a human driver. In an embodiment, these inputs are determined by planning module 304 and control module 305. In an embodiment, while a human is driving the ADV, the planning module 304 and control module 305 can be turned OFF.

Logging module 306 can also receive ADV driving decisions from decision module 303. ADV driving decisions can be on a per-object basis. ADV driving decisions can include overtake object, yield to object, stop ADV, or ignore object.

ADV driving decision logs can be stored in ADV decision logs 314 in persistent storage device 352.

Driving logs 313, perception logs 312, and ADV driving decision logs 313 comprise logging information. Logging module 306 can store logging information in real-time, or near real-time in persistent storage 352 of ADV 101. In addition, or alternatively, logging module 306 can transmit logging information to server 103 via network 102. In an embodiment, logging module 306 can transmit logging information to server 103 in real-time or near real-time. In an embodiment, logging module 306 can transmit logging information to server 103 after a driving scenario is completed, or at another time.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
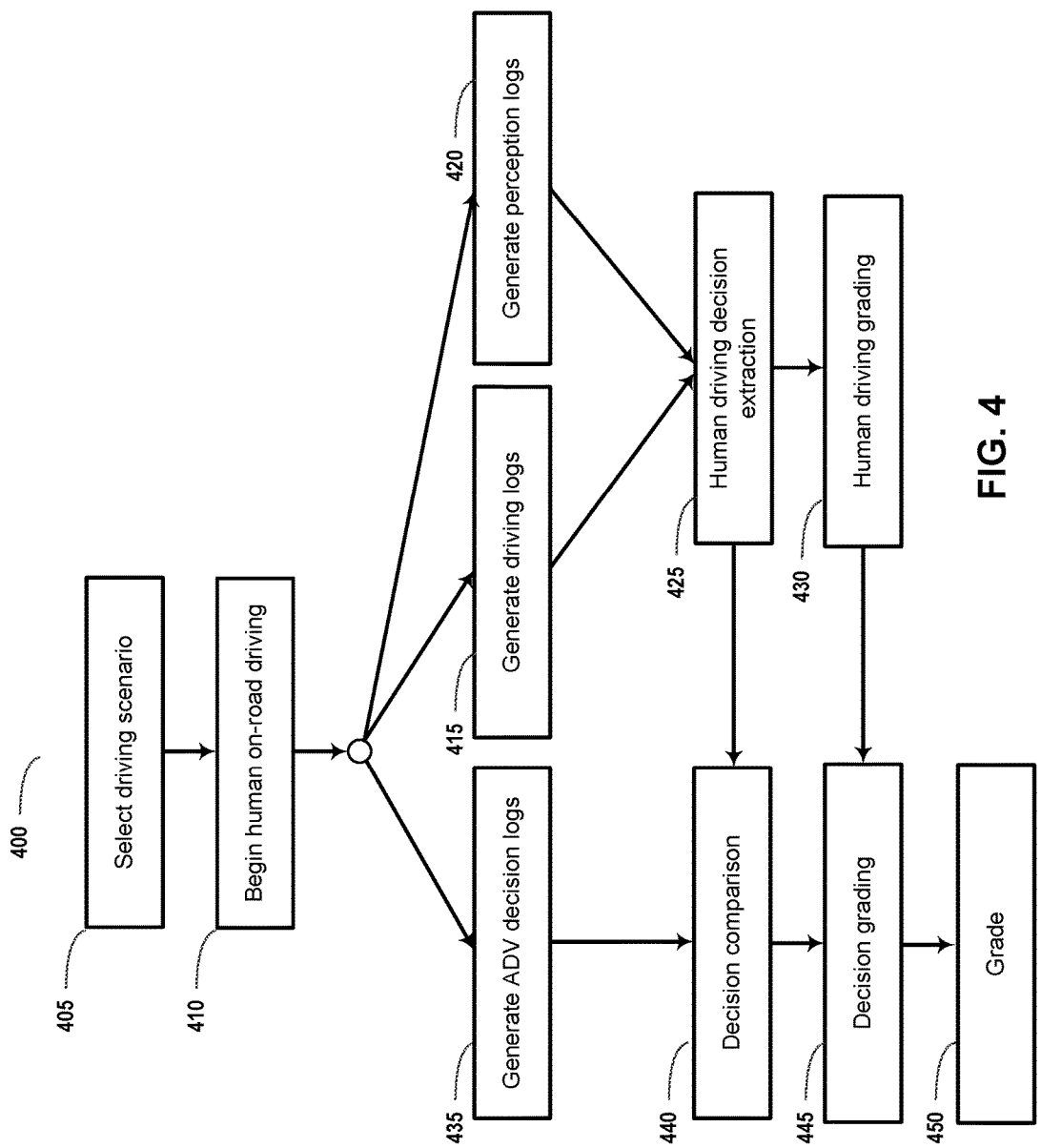
FIG. 4 illustrates, in block form, an overview of a method of evaluating human and ADV driving decisions, according to some embodiments.

FIG. 4 illustrates, in block form, an overview of a method 400 of evaluating human and ADV driving decisions, according to some embodiments.

In operation 405, a driving scenario can be selected. A real world route can be selected for an evaluation purpose. The street/road selected for the driving scenario could be a public one without any controls, such as traffic control signs or traffic lights, or a controlled or semi-controlled street could be used, if needed. To make the evaluation more general, a set of scenarios with different types of road, e.g., highway, city, suburban, are recommended.

In operation 410, a user begins driving the autonomous driving vehicle (ADV) 101. A human user can drive the ADV 101 with the planning and control functions turned off. The ADV can log three types of information: ADV driving decision logs 314, which log a decision for each object perceived by the perception module 302, human driving logs 313 which can include vehicle speed, location, and orientation, of the ADV 101, and perception logs 312 which can include objects sensed by the perception module 302, and the speed, location, and orientation of each object sensed.

In operation 415, logging module 306 can generate driving human driving logs 313.

In operation 420, logging module 306 can generate perception logs 312.

In operation 435, logging module 306 can generate ADV driving decision logs 314.

In operation 425, a human driving decision can be extracted by human driving decision extraction module 103B. Human driving decision extraction module 103B can learn a human driving decision based on human driving logs 313 and perception logs 312, and ADV driving decision logs 314.

In operation 430, a human driving grading module 103C can grade the human driving decision, based on human driving logs 415, perception logs 425. The human driving decision grading module 103C can automatically grade each decision in terms of comfort, compliance with traffic rules, safety, and time-efficiency.

In operation 440, an ADV decision corresponding to the human driving decision can be compared with the human driving decision. In operation 445, the ADV decision can be graded based upon the comparison in operation 440, and driving logs 415 and perception logs 420. If the ADV decision and human decision are the same, then in operation 450 the human driving decision grade can be used for the ADV driving decision grade. Otherwise, in operation 450, the differences between the human driving decision grade and the ADV driving decision grade can be used to modify or generate the ADV driving decision grade.

Figure 5:
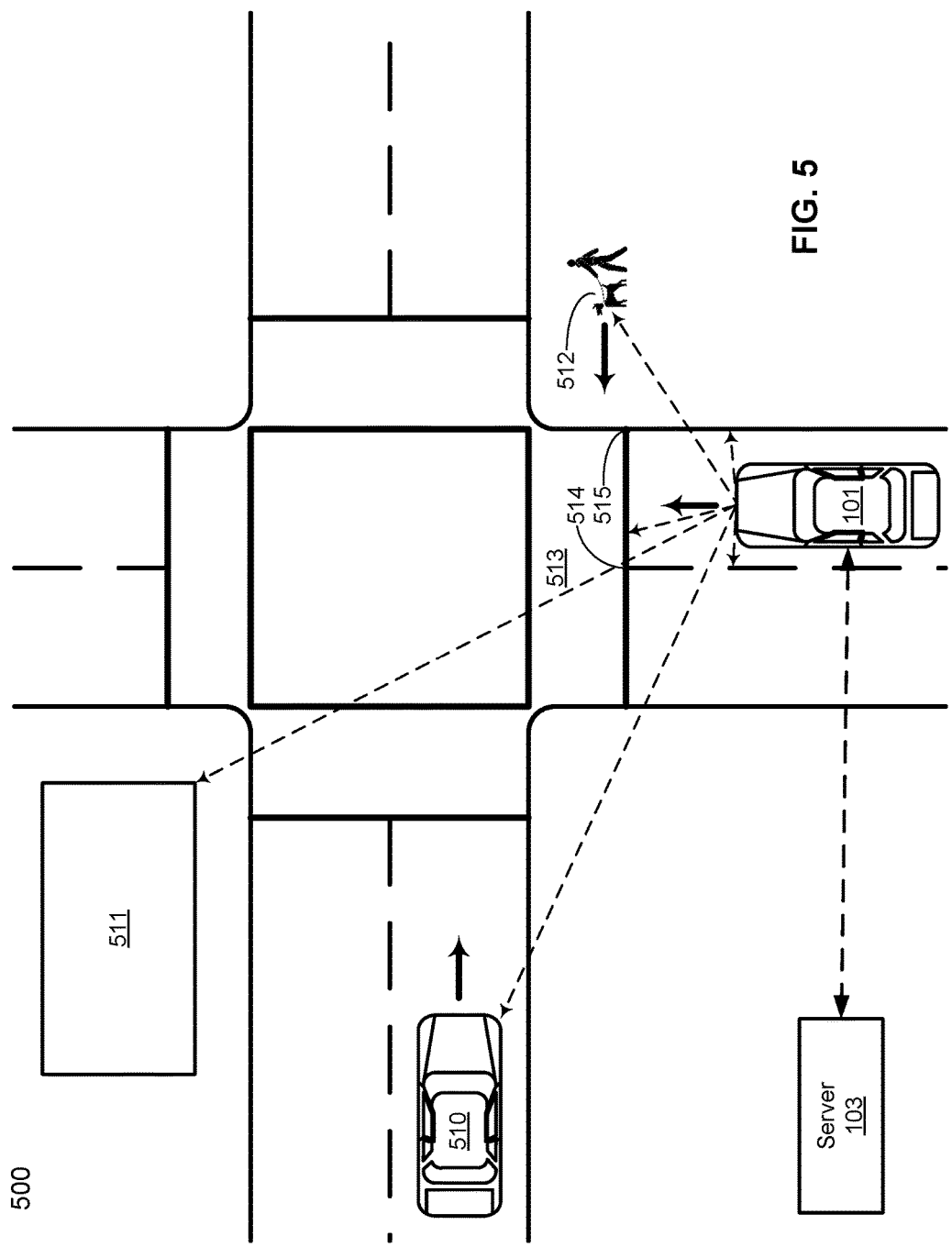
FIG. 5 is an example driving situation in which one or more driving decisions may be made.

FIG. 5 is an example, driving scenario 500, in which one or more driving decisions may be made. In the following driving scenario, speed, distance and orientation are of objects are with respect to ADV 101. In an embodiment, speed, distance and orientation of objects in the driving scenario can be expressed with respect to a coordinate system such as GPS, or a map coordinate system. In an embodiment in which speed, distance and orientation are relative to ADV 101, orientation of ADV 101 can be 0°="straight ahead" of ADV 101, objects travelling left-to-right in front of the ADV can have a positive orientation, e.g. +90° or → such as car 510. Objects traveling right-to-the left in front of the ADV 101 can have negative orientation, e.g. −90° ←, or such as pedestrian/dog 512.

In this scenario, an ADV 101 is approaching a 4-way intersection having crosswalks 513 at each corner of an intersection. The ADV 101 is in communication with a server 103 that can collect ADV decision logs 314, human driving logs 313, and perception logs 312 for ADV 101. Also in this scenario various objects are detected and logged in the perception logs 312 for ADV 101. The objects include an oncoming car 510, a building 511, a pedestrian and a dog 512, left edge of driving lane 514 and right edge of driving lane 515 adjacent to ADV 101.

ADV 101 is approaching the intersection crosswalk 513 at a speed, distance and orientation with respect ADV 101. At a time, t0, ADV 101 may be traveling at 25 mph, at 0° relative to ADV 101 (straight ahead). Car 510 may also be traveling at 25 mph, located at a distance of 101 feet from ADV 101 and −75° relative to ADV 101, and, oriented at +90° with respect to ADV 101. In simple terms, car 510 is about 100 feet away from ADV 101, and approaching the intersection from the left of ADV 101 at 25 mph. At time t0, ADV 101 may make a decision whether to overtake car 510, stop, yield to car 510, or ignore car 510.

ADV 101 can also perceive house 511. Since a house is a stationary object, at time t0, the speed of house 511 will be 0 mph. At time t0, house 511 may be located at −28° relative to ADV 101, and 111 feet away from ADV 101. Since house 511 is stationary, the house 511 has no orientation.

In addition, ADV 101 can also perceive pedestrian and dog 512 (or just, "pedestrian") approaching the intersection from a different direction. At a time t0, pedestrian 512 may be traveling at 3 mph, located at +36° relative to ADV 101 and at a distance of 40' from ADV 101. In simple terms, a man and his dog are approaching the crosswalk 513 from the right at walking speed at about the same time that car 510 is approaching the intersection from the left of ADV 101 at residential driving speed. If ADV 101, car 510, and pedestrian 512 continue at their current respective speeds and orientations, then pedestrian 512 may enter the crosswalk 513 at about the same time that car 510 crosses the intersection, at about the same time that ADV 101 will cross the crosswalk 513 and enter the intersection. In some states, by law, a pedestrian entering a crosswalk has a right of way that takes precedence over cars entering an intersection that contains the crosswalk 513. In some states, when two cars approach an intersection simultaneously, the car on the right (in this case, ADV 101) is required by law to yield to the car on the left (in this case, car 510). In the evaluation framework of this disclosure, both ADV 101 and human driver of ADV 101 will need to make a driving decision that accounts for all objects: ADV 101, car 510, house 511, pedestrian 512, and crosswalk 513. For each object 510-513, a decision is made to overtake the object, yield to the object, stop, or ignore the object.

Human decisions are subjective and will vary by driver. A first driver may decide to overtake car 510 and pedestrian 512 (and thereby, overtake crosswalk 513), and ignore house 511, in order to be the first through the intersection. This decision may break one or more traffic rules including maximum speed for the intersection, yielding an intersection to another vehicle, and stopping for a pedestrian at a crosswalk, but it will save driving time. The decision may also require acceleration and a possible nudge, or swerve, in lane position to avoid car 510 or pedestrian 512. This may reduce comfort of the passengers as the ADV passengers experience both forward and lateral acceleration. A second driver of an ADV 101 may choose to slow to yield the intersection to car 510, and stop 5 feet before crosswalk 513 to allow pedestrian 512 to cross the street in crosswalk 513. This decision complies with all laws, increases safety by avoiding a possible collision with car 510 or injury to pedestrian 512, and also provides a comfortable deceleration. But, the decision may be less time efficient. ADV 101 decision module 303 may make a different decision, such as yield to the car 101 entering the intersection, but overtake pedestrian 512, thereby overtaking crosswalk 513, and ignore house 511. As described below, the evaluation system disclosed herein can compare, and grade, the human and ADV driving decisions.

Figure 6:
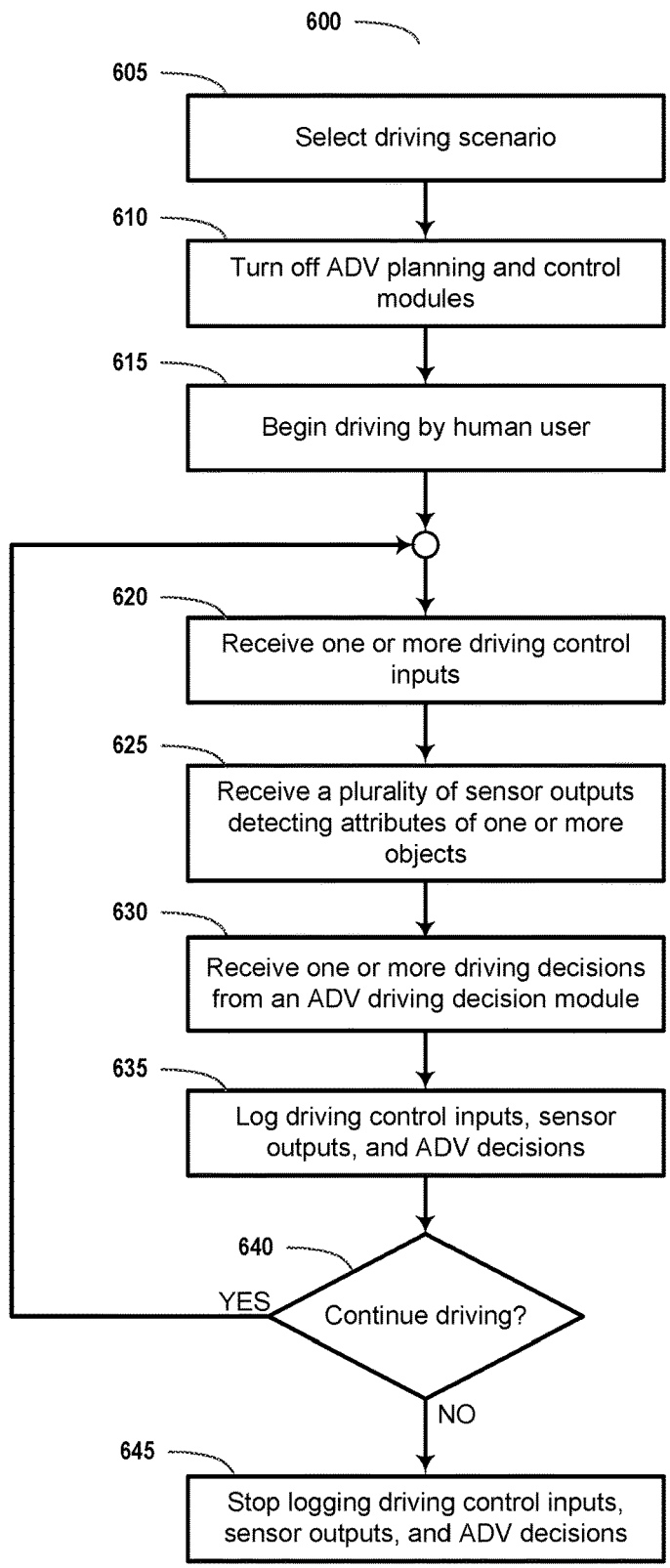
FIG. 6 illustrates, in block form, a method of generating and collecting information to be used in evaluating human and ADV driving decisions, according to some embodiments.

FIG. 6 illustrates, in block form, a method 600 of generating and collecting information to be used in evaluating human and ADV driving decisions, according to some embodiments. In an embodiment, method 600 can be implemented on-line, in real-time or near real-time, such as while the ADV 101 is being driven by a human driver. In an embodiment, collected information can be transmitted, e.g. over network 102, to server 103. In addition, or alternatively, collected information can be stored in, e.g. persistent storage device 352 of the ADV while the ADV 101 is being driven by the human driver.

In operation 605, a driving scenario for evaluation can be selected. A driving scenario can include a particular destination, a type of traffic (heavy vs. light), a speed of driving (freeway vs. in town), a time of day (commute traffic vs. weekend traffic, vs. mid-day on a weekday traffic), a length of the trip (short vs. long), whether the human driver is, or is not, familiar with the driving area, or other driving scenarios.

In operation 610, ADV planning 304 and control module 305 can be turned off. An ADV driving decision module 303 is still active, and ADV driving decisions will be made and logged, but ADV driving decisions will not be planned or executed by the ADV 101. Instead, a human driver will control acceleration, braking, and steering of the ADV.

In operation 615, a human user can begin driving the ADV.

In operation 620, ADV control system 111 can receive one or more driving control inputs from the human driver. Driving control inputs can include throttle inputs 202 (including deceleration), braking inputs 203, and steering inputs 201 (an amount right, left, or centered). Driving control inputs 111 can also include derivatives of inputs, such as a rate at which an input is applied, e.g. human driver "stomps" on the throttle or brake controls, or "cranks" the steering sharply left or right. The driving control inputs can be passed to logging module 306.

In operation 625, logging module 306 can receive outputs from a plurality of sensors in ADV sensor system 115. The plurality of sensor outputs can detect or represent attributes of one or more objects. For example, a camera 211 can detect presence of a moving or stationary object, e.g. car 510, building 511, or pedestrian 512; LIDAR unit 215 can detect a distance of an object from ADV 101. RADAR unit 214 can detect distance, orientation, and speed of objects. GPS unit 212 can detect location of objects with respect to GPS coordinates. In an embodiment, outputs of one or more sensors can be used together to improve accuracy of determining speed, location, or orientation of an object.

In operation 630, logging module 306 can receive one or more driving decisions generated by ADV driving decision module 303. The ADV driving decisions are not executed because ADV planning 304 and control 305 modules were turned off in operation 610, above. The ADV driving decisions can be passed to logging module 306.

In operation 635, outputs from sensors 115, received by logging module 306 in operation 625, can be periodically time stamped and stored in perception log 312. An example perception log 800 is described below with reference to FIG. 8A. One or more driving control inputs, received by logging module 306 in operation 620, can be time stamped and written to driving log 313. An example driving log is described below with reference to FIG. 8B. One or more ADV driving decisions, received by logging module 306 in operations 635, can be time stamped and logged as ADV driving decision log 314. An example ADV driving decision log is described below, with reference FIG. 8C.

In operation 640, it can be determined whether driving is to continue. The decision can be inferred from whether the ADV is moving. If so, driving is continuing. If the selected driving scenario in 605 has a route and/or destination, then the decision that driving has ended can be inferred from ADV reaching the destination, and being stopped. Otherwise, the ADV it can be inferred that the ADV is to continue driving until an explicit indication that driving is to end has been received by the ADV.

If, in operation 640, driving is to continue, then method 600 continues at operation 620. Otherwise method 600 continues at operation 645.

In operation 645, ADV decision module 303 stops generating ADV driving decisions, and logging module 306 stops writing to the perception log 312, driving control log 313, and ADV decision log 314, and method 600 ends.

Figure 7:
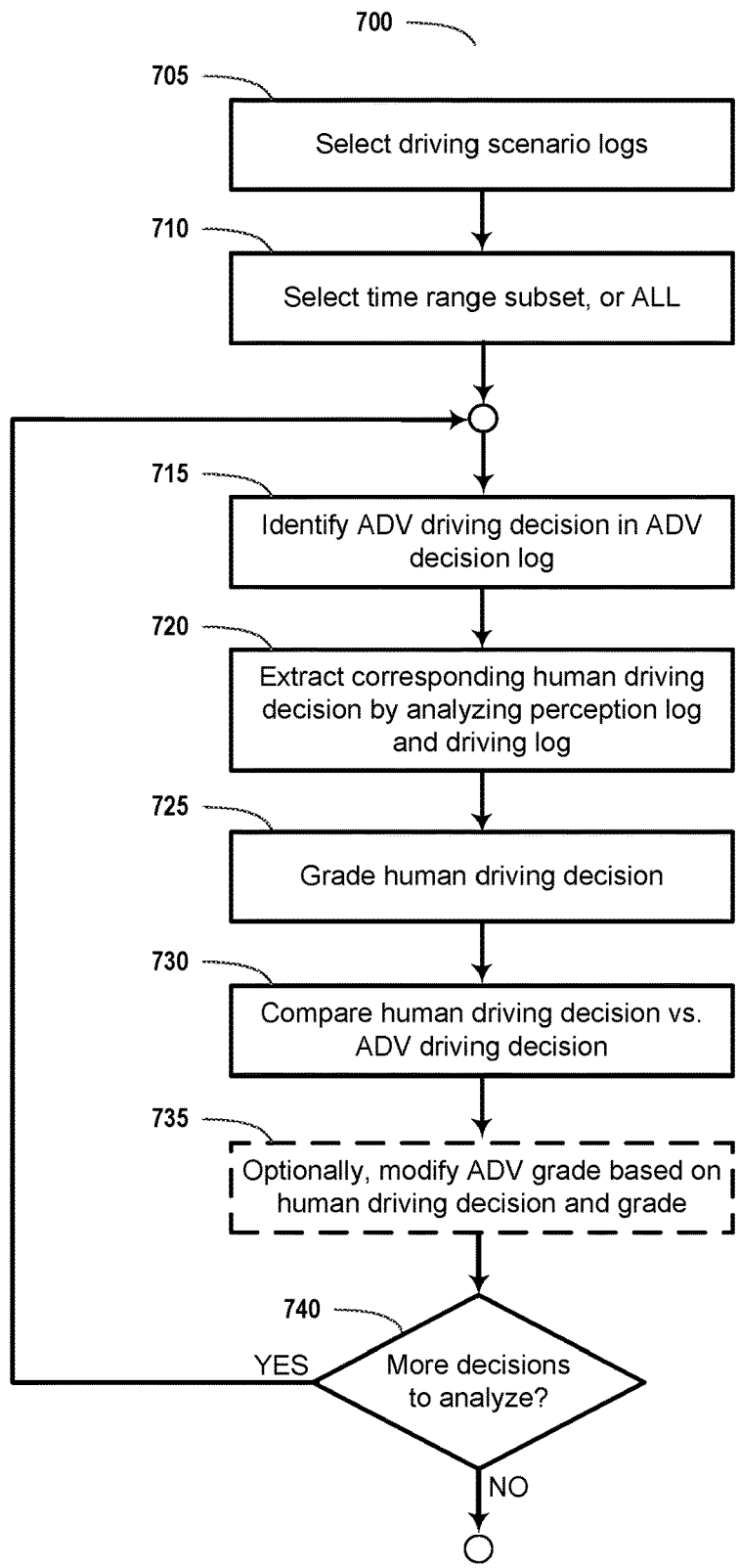
FIG. 7 illustrates, in block form, a method of evaluating human and ADV driving decisions, according to some embodiments.

FIG. 7 illustrates, in block form, a method 700 of evaluating human and ADV driving decisions, according to some embodiments. In an embodiment, method 700 can be performed off-line, by e.g. server 103 data analytics system. In an embodiment, method 700 can be performed in real-time, or near real-time, or shortly after the data used by method 700 is collected. Method 700 can be used to evaluate human and ADV driving decisions for a single ADV. In an embodiment, method 700 can evaluate human and ADV driving decisions for a large plurality of ADVs.

In operation 705, a driving scenario can be selected, to narrow the results of the evaluation framework to a particular driving scenario.

In operation 710, a time range can be used to narrow the logging information to use for method 700, or ALL data can be selected. Logging information includes perception logs 312, driving logs 313, and ADV driving decisions 314 for the scenario selected in operation 705.

In operation 715, an ADV driving decision can be identified in ADV driving decision log 314 for the selected scenario, and as may be limited by time range in operation 710. A driving decision is specific to an object. For example, as described in example driving log 810 of FIG. 8C, an ADV 101 driving decision at time t0 with respect to car 510 can be "overtake car 510." Another example ADV driving decision, with respect to crosswalk 513 at time t2, can be "stop before crosswalk 513."

In operation 720, a human driving decision corresponding to the ADV driving decision can be extracted using perception logs 312 and driving log 313. A human has a typical reaction time of about 0.75 seconds. An ADV driving decision can be made virtually instantaneously, in response to data received from the sensors in perception module 303. Thus, an ADV driving decision made at, e.g. time t0, may correspond more closely to a human driving decision at time t1. Thus, extracting a human decision to compare with an ADV driving decision can include examining perception logs 312 and driving logs 313 at a time shortly after the ADV driving decision. A human driving decision can further be inferred from driving inputs in the driving log 313. A driving decision about an object, whether by a human or an ADV, will result in driving inputs, or a lack of driving inputs if the decision is "ignore object." Thus, when an ADV makes a driving decision, the human driver also likely makes a driving decision, and a human decision was likely made at a time after the ADV decision corresponding to human reaction time.

In operation 725, the human driving decision can be graded using, e.g. grading module 103C of server 103. Grading of the decision can include metrics for safety, comfort of the driver and/or passengers within the ADV, compliance with driving rules (laws), and time efficiency. In an embodiment, each metric can be given a score from 0.1. For example, driving decision grading module 103C can determine that, with respect to an approaching car, the human decided to yield to the approaching car and allow it to pass. The decision can be inferred from driving log 313 indicating reduced throttle input 202, increased brake input 203, and from perception logs 312 indicating that the approaching car passed across the front of ADV 101 at a distance that is considered safe, using braking that did not cause uncomfortable deceleration for the passengers, and did not break any traffic rules during the execution of the yield decision. Time efficiency can be determined by the actual time that it took to slow the ADV and resume driving speed, vs. an estimated time that would have elapsed, e.g., had the decision to yield not been made.

In operation 730, driving decision grading module 103C can compare the human driving decision to the ADV driving decision. Because the planning and control modules of the ADV were turned off during the driving scenario, and a human was driving the ADV, the effects of the ADV driving decision cannot be directly determined from the driving logs 313 and perception logs 312. However, the ADV driving decision grade can still be estimated using the perception logs 312 and driving logs 313. An example of estimating a grade of an ADV driving decision after comparing the human decision and ADV decision is described below with reference to FIG. 8D.

In operation 735, the ADV driving decision grading module 103C can optionally modified the ADV driving decision grade based upon the comparison to the human driving decision, the ADV driving decision, the human driving decision grade, and the estimated ADV driving decision grade.

In operation 740, it can be determined whether there are more ADV decisions to analyze. If so, then method 700 resumes at operation 715, otherwise method 700 ends.

FIG. 8A illustrates an example perception log 800, according to some embodiments. A perception log 312 (of which perception log 800 is an example) is a log of sensor outputs recorded during a driving scenario. Perception log 312 identifies objects perceived by ADV sensors, a speed of each object, a location of each object, and an orientation of each object, for a plurality of increments of time. Example perception log 800 represents information logged at times t0, t1, and t2, for objects: 101 ADV, 510 car, 511 house, 512, man/dog, 513 crosswalk, 514, left edge of lane for ADV 101, and 515, right edge of lane for ADV 101. These are just examples. The logged information can be represented in a variety of formats, including tables, spreadsheets, database tables, or other formats. For each object, at each time increment, a speed of the object, a location of the object, and an orientation of the object can be recorded in the perception log 312. In an embodiment, location can be expressed in 2D or 3D coordinates, from which distance can be computed. In an embodiment, location can be stored in polar coordinate format, with a distance from the ADV 101 and angle of rotation from a known point, such as a grid or the orientation of the forward direction of the ADV 101. In an embodiment, orientation can be with respect to a universal standards, such as North, or a GPS grid. In an embodiment, orientation can be with respect to the forward direction of the ADV 101. In an embodiment, perception log 312 can additionally log an image of one or more of the objects corresponding to a perception log 312 entry.

In an embodiment, raw sensor outputs may be processed to obtain desired information. For example, an orientation of an object, e.g. car 510, may be obtained using outputs from a plurality of sensors of sensor system 115. LIDAR may be used to determine a distance (e.g. 101 feet, at time t0) that the car 510 is away from ADV 101. One or more RADAR readings may be used to obtain an orientation of the car 510 with respect to ADV 101 (−75° at time t0). A difference in location of car 510 between times t0 and t1 can be used to determine a speed of car 510 (e.g. 23 mph at t1).

Inferences can be drawn from perception log 312. For example, in example perception log 800, viewing the row 101 for the ADV, it can be seen that between time t0 and t2, the ADV 101 is slowing down to a stop. Taking that information, while viewing row 512 man/dog, and row 513 crosswalk, it can be seen that man/dog 512 are nearing the ADV 101 from the right side of the ADV 101, and that the ADV is stopping before reaching the crosswalk 513. It can be inferred that the human driving decision is to stop before the crosswalk 513 and allow the man/dog 512 to use the crosswalk 513. Similarly, viewing the row for car 510, it can be seen that car 510 approached ADV 101 from the left, and slowed slightly as it crossed in front of ADV 101, while the man/dog 512 used the crosswalk 513. Thus, it can be inferred that the human decision was to yield, or stop, with respect to the approaching car 510.

FIG. 8B illustrates an example driving log 805, according to some embodiments. A driving log 313 (of which driving log 805 is an example) records the driving control inputs of a human driver to the ADV 101 driving controls at a plurality of increments of time during a driving scenario. In an embodiment, driving control input data may also be associated with speed, location, and orientation of the ADV when the driving control inputs were logged. In an embodiment, if speed, location and orientation of the ADV 101 is stored in the perception log 312, then the driving log 313 may contain a pointer or other reference to this information in the perception log 312. A driving control input can include a throttle input 202 amount, a brake input 203 amount, and a steering input 201 amount. The steering input 201 amount can indicate a direction of the input (left or right, clockwise or counter-clockwise). A driving control input can also include a derivative of these inputs (not shown), to indicate a rate of change of the driving control input. For example, a high rate of change of the throttle input 202 can indicate that the human driver "stomped" on the throttle to achieve fast acceleration. Similarly, a high rate of change of braking input 203 can indicate that the human driver "stomped" on the brakes, and a high rate of change on the steering input 201 can indicate that the human driver "cranked" the steering wheel hard to the right or left. When grading a driving decision, each of these high rate inputs can have a negative effect on passenger comfort, safety, and possibly rule compliance.

FIG. 8C illustrates an example ADV driving decision log 810 according to some embodiments. An ADV driving decision log 314 (of which driving decision log 810 is an example) is a record of driving decisions made by ADV driving decision module 303 during a driving scenario. During a driving scenario, the planning and control modules of the ADV 101 are turned off. Thus, the ADV driving decisions are not executed. Instead, a human driver is controlling the ADV and the ADV decisions (which would be executed if planning and control modules were turned ON) are being logged in ADV driving decision log 314.

The ADV 101 makes a driving decision for every perceived object at a plurality of time increments, as indicated in the example perception log 810. Example ADV driving decision log 810 shows ADV driving decisions made at each of times t0, t1, and t2, for each object 510 car, 511 house, 512 man/dog, and 513 crosswalk. Since the planning and control modules are turned off during the evaluation driving by a human user, control of ADV 101 is by the human driver. An ADV driving decision may differ from a corresponding human driving decision for an object. Thus, the ADV driving decision log 314 may contain ADV driving decisions that are a reaction to a decision made by the human driver. For example, at time t0, the ADV driving decision may be to overtake the man/dog 512 and the car 510. Also at t0, the human driving decision may be to yield to the car 510 and stop for the crosswalk 513 and man/dog 512. To implement the human decision, the human may reduce throttle input 202 and increase braking input 203, causing the ADV 101 to slow down. At time t1, the ADV 101 decision module 303 can use data in the perception module 302 and/or information in perception log 312 to determine that the ADV 101 is now too close to approaching car 510 to overtake car 510, and too close to crosswalk 513 and man/dog 512 to overtake them as well. Thus, at time t1, based on changes of speed, location and/or orientation of one or more objects, including the ADV 101, the ADV driving decision module 303 may change its driving decision for each object to be same as the human driving decision for each object.

FIG. 8D illustrates an example of scoring of a human driving decision 815 with reference to an object car 510 at time t0, according to some embodiments. Grading of a driving decision can be implemented by, e.g., server 103 driving decision grading module 103C. As described above, an ADV driving decision is made for each object perceived by perception module 302 and/or logged in perception log 312. FIG. 8D describes a grading example for one ADV decision, one corresponding human driving decision, for one perceived object at a particular time, e.g. t0. A grade of a driving decision (human or ADV) can be made up of different metrics, including safety 820, passenger comfort 825, rule compliance 830, and time efficiency 835. Safety metric 820 can take into account road conditions (wet, dry, icy, snow, light intensity, darkness, etc.), distance to other objects perceived by perception module 302, speed and orientation of each object with respect to the ADV 101, speed of the ADV, whether the ADV is travelling uphill or downhill, maintaining a safe lane position within the ADV driving lane, combinations of one or more of the foregoing, and other factors. Passenger comfort metric 825 can take into account forward/backward acceleration of the ADV, lateral acceleration of the ADV, oscillation (swerving) of the ADV, and other factors that affect passenger comfort. Rule compliance metric 830 can detect, or estimate, compliance with traffic laws and recommended safe practices for operating a vehicle under the driving conditions determinable from the perception module 302 and driving control inputs 201-203 of control system 111. Rule compliance can include a count of major and minor infractions of driving laws and safe practices. Time efficiency metric 835 can take into account the effect of a driving decision has upon the length of a portion of the driving scenario. For example, yielding to an approaching car may be safer, but overtaking the approaching car may be more time efficient. Overtaking the approaching car may possibly involve violating some traffic laws or safe practices.

In the example grading comparison 815, a human driving decision to yield to an approaching car 510 is compared with an ADV driving decision to overtake the approaching car 510. Suppose, in this example, that yielding to the oncoming car meant slowing to a stop at a yellow light in front of the ADV, and allowing the traffic light to turn red toward the ADV. The approaching car 510 may receive a green light ADV, permitting the approaching car 510 to cross the intersection in front of the ADV. The human decision to yield to the oncoming car 510 has a safety value of 1.0 (highest), but a time efficiency of 0.3 because the ADV 101 must wait for a complete cycle of the traffic light before the ADV can continue in the driving scenario. In contrast, the ADV driving decision to go through the yellow light may have be less safe, and may possibly violate a traffic law, such as accelerating at a yellow light, or not exiting from the intersection by the time that the traffic light turned red. But, the ADV driving decision is more time efficient because the ADV 101 can continue in the driving scenario as compared with waiting for a complete traffic light cycle as with the human driving decision.

Server 103 can analyze a large plurality of similar driving scenarios and ADV vs. human driving decisions and their respective grades. Then server 103 can use machine learning engine 103A to refine ADV driving decisions based the grades.

Figure 9:
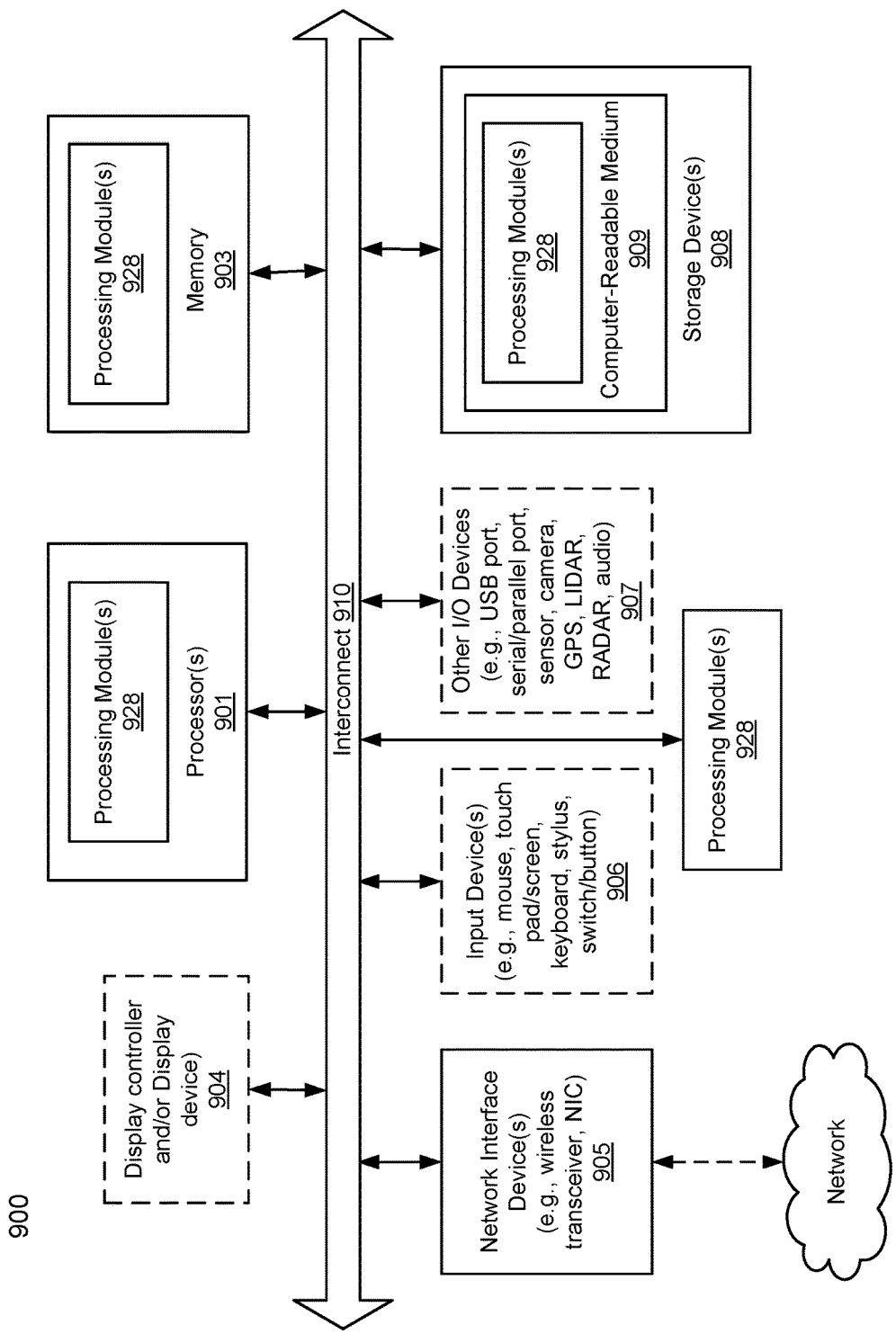
FIG. 9 is a block diagram illustrating a data processing system according to one embodiment.

FIG. 9 is a block diagram illustrating an example of a data processing system 900 which may be used with one embodiment of the invention. For example, system 900 may represent any of the data processing systems described above performing any of the processes or methods described above, such as, for example, autonomous vehicle 101 systems, such as perception and planning 110, control system 111, etc., or any of servers 103-104 of FIG. 1. System 900 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 900 is intended to show a high level view of many components of the computer system. However, it is to be understood that additional components may be present in certain implementations and furthermore, different arrangement of the components shown may occur in other implementations. System 900 may represent a desktop, a laptop, a tablet, a server, a mobile phone, a media player, a personal digital assistant (PDA), an embedded processing controller, a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 900 includes processor 901, memory 903, and devices 905-908 via a bus or an interconnect 910. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions. In an embodiment, processor(s) 901 comprise at least one hardware processor.

Processor 901, which may be a low power multi-core processor socket such as an ultra-low voltage processor, may act as a main processing unit and central hub for communication with the various components of the system. Such processor can be implemented as a system on chip (SoC). Processor 901 is configured to execute instructions for performing the operations and steps discussed herein. System 900 may further include a graphics interface that communicates with optional graphics subsystem 904, which may include a display controller, a graphics processor, and/or a display device.

Processor 901 may communicate with memory 903, which in one embodiment can be implemented via multiple memory devices to provide for a given amount of system memory. Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 900 may further include IO devices such as devices 905-908, including network interface device(s) 905, optional input device(s) 906, and other optional IO device(s) 907. Network interface device 905 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 907 may include an audio device. An audio device may include a speaker and/or a microphone to facilitate voice-enabled functions, such as voice recognition, voice replication, digital recording, and/or telephony functions. Other IO devices 907 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 907 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 910 via a sensor hub (not shown), while other devices such as a keyboard or thermal sensor may be controlled by an embedded controller (not shown), dependent upon the specific configuration or design of system 900. IO devices 907 may further include a RADAR system (radio detection and ranging), a LIDAR system (light detection and ranging), a GPS system (global positioning system), cell phone subsystems that can detect and triangulate using cell towers, microphone(s), and other, audio and/or video recording device(s), position, distance, time, speed, acceleration, horizontal and vertical level detectors, orientation, and directional sensors.

To provide for persistent storage of information such as data, applications, one or more operating systems and so forth, a mass storage (not shown) may also couple to processor 901. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 901, e.g., via a serial peripheral interface (SPI). This flash device may provide for non-volatile storage of system software, including BIOS as well as other firmware of the system.

Storage device 908 may include computer-accessible storage medium 909 (also known as a machine-readable storage medium or a computer-readable medium) on which is stored one or more sets of instructions or software (e.g., module, unit, and/or logic 928) embodying any one or more of the methodologies or functions described herein. Processing module/unit/logic 928 may represent any of the components described above, such as, for example, autonomous vehicle 101 (AV) driving decision logging, sensor logging, driving control inputs logging, driving decision extraction module, driving decision grading module, and one or more modules to process sensor data to for driving the AV planning and control modules. Processing module/unit/logic 928 may also reside, completely or at least partially, within memory 903 and/or within processor 901 during execution thereof by data processing system 900, memory 903 and processor 901 also constituting machine-accessible storage media. Processing module/unit/logic 928 may further be transmitted or received over a network via network interface device 905.

Computer-readable storage medium 909 may also be used to store the some software functionalities described above persistently. While computer-readable storage medium 909 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 928, components and other features described herein can be implemented as discrete hardware components or integrated in the functionality of hardware components such as ASICS, FPGAs, DSPs or similar devices. In addition, processing module/unit/logic 928 can be implemented as firmware or functional circuitry within hardware devices. Further, processing module/unit/logic 928 can be implemented in any combination hardware devices and software components. Processing modules 928 can include, e.g. server 103 machine learning engine 103A, driving decision extraction module 103B, and driving decision grading module 103C. Processing modules 928 can further include, e.g., ADV 101 localization module 301, perception module 312, decision module 303, planning module 304, control module 305, and logging module 306.

Note that while system 900 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
  receiving a plurality of autonomous driving vehicle (ADV) logs;

extracting a human driving decision corresponding to an ADV driving decision using the plurality of ADV logs;

grading the human driving decision in accordance with a plurality of grading metrics; and generating a grade for the ADV driving decision that is based at least in part on the grade of the human driving decision and a comparison of the human driving decision to the ADV driving decision, wherein the grade for the ADV driving decision is utilized to modify algorithms for subsequent ADV driving.

2. The method of claim 1, wherein the plurality ADV logs comprise a log of a plurality of ADV driving decisions made by a decision module of the ADV, a perception log comprising a log of a plurality of object sensor outputs, and a driving log comprising a log of a plurality of driving control inputs, wherein the plurality of driving control inputs were captured from the ADV while the ADV was driven by a user.

3. The method of claim 2, wherein a driving control input of the plurality of driving control inputs comprises one of an input amount to an acceleration control, an input amount to a brake control, or an input amount to a steering control.

4. The method of claim 2, wherein extracting the human driving decision corresponding to the ADV driving decision, with respect to an object, comprises one or more of:

determining a time at which the ADV decision was made;

analyzing the perception log for a time before and after the ADV driving decision; or analyzing the driving log for a period of time before, and a period of time after, occurrence of the ADV driving decision being extracted;

wherein analyzing comprises determining a relationship between one or more of the plurality of driving control inputs and a location or distance of the object with respect to the ADV.

5. The method of claim 2, wherein an object sensor comprises one or more of light detection and ranging (LIDAR), radio detection and ranging (RADAR), global positioning system (GPS), or a camera, and wherein an object sensor output of the plurality of sensor object outputs comprises one or more of a distance to an object from the ADV, a speed of an object external to the ADV, a speed of the ADV, an orientation of an object external to the ADV with respect to the ADV, a direction of an object external to the ADV, a direction of the ADV, or a location of the ADV.

6. The method of claim 1, wherein the ADV driving decision is specific to an object external to the ADV and the ADV driving decision comprises one of: overtake the object, yield to the object, stop the ADV at least a minimum distance from the object, or ignore the object.

7. The method of claim 1, wherein a grading metric of the plurality of grading metrics comprises a safety metric, a comfort metric, a rule compliance metric, or a time efficiency metric.

8. The method of claim 1, wherein grading the human driving decision comprises:

analyzing one or more driving inputs or one or more object sensor outputs that were logged after the human driving decision was logged, to determine a metric for safety, comfort, rule compliance, or time efficiency of the human driving decision.

9. The method of claim 1, wherein grading the ADV driving decision comprises:

estimating one or more driving inputs or one or more object sensor outputs, after the ADV driving decision, to determine a metric for safety, comfort, rule compliance, or time efficiency of the ADV driving decision.

10. The medium of claim 9, wherein grading the ADV driving decision comprises:

estimating one or more driving inputs or one or more object sensor outputs, after the ADV driving decision, to determine a metric for safety, comfort, rule compliance, or time efficiency of the ADV driving decision.

11. A non-transitory machine-readable medium having instructions stored therein, which when executed by a processor, cause the processor to perform operations, the operations comprising:

receiving a plurality of autonomous driving vehicle (ADV) logs;

extracting a human driving decision corresponding to an ADV driving decision using the plurality of ADV logs;

grading the human driving decision in accordance with a plurality of grading metrics; and generating a grade for the ADV driving decision that is based at least in part on the grade of the human driving decision and a comparison of the human driving decision to the ADV driving decision, wherein the grade for the ADV driving decision is utilized to modify algorithms for subsequent ADV driving.

12. The medium of claim 11, wherein the plurality ADV logs comprise a log of a plurality of ADV driving decisions made by a decision module of the ADV, a perception log comprising a log of a plurality of object sensor outputs, and a driving log comprising a log of a plurality of driving control inputs, wherein the plurality of driving control inputs were captured from the ADV while the ADV was driven by a user.

13. The medium of claim 12, wherein a driving control input of the plurality of driving control inputs comprises one of an input amount to an acceleration control, an input amount to a brake control, or an input amount to a steering control.

14. The medium of claim 12, wherein extracting the human driving decision corresponding to the ADV driving decision, with respect to an object, comprises one or more of:

determining a time at which the ADV decision was made;

analyzing the perception log for a time before and after the ADV driving decision; or analyzing the driving log for a period of time before, and after of time after, occurrence of the ADV driving decision being extracted;

wherein analyzing comprises determining a relationship between one or more of the plurality of driving control inputs and a location or distance of the object with respect to the ADV.

15. The medium of claim 12, wherein an object sensor comprises one or more of light detection and ranging (LIDAR), radio detection and ranging (RADAR), global positioning system (GPS), or a camera, and wherein an object sensor output of the plurality of object sensor outputs comprises one or more of a distance to an object from the ADV, a speed of an object external to the ADV, a speed of the ADV, an orientation of an object external to the ADV with respect to the ADV, a direction of an object external to the ADV, a direction of the ADV, or a location of the ADV.

16. The medium of claim 11, wherein the ADV driving decision is specific to an object external to the ADV and the ADV driving decision comprises one of: overtake the object, yield to the object, stop the ADV at least a minimum distance from the object, or ignore the object.

17. The medium of claim 11, wherein a grading metric of the plurality of grading metrics comprises a safety metric, a comfort metric, a rule compliance metric, or a time efficiency metric.

18. The medium of claim 11, wherein grading the human driving decision comprises:
analyzing one or more driving inputs or one or more object sensor outputs that were logged after the human driving decision was logged, to determine a metric for safety, comfort, rule compliance, or time efficiency of the human driving decision.

19. A data processing system, comprising:
a processor; and
a memory coupled to the processor to store instructions, which when executed by the processor, cause the processor to perform operations, the operations including:
receiving a plurality of autonomous driving vehicle (ADV) logs,
extracting a human driving decision corresponding to an ADV driving decision using the plurality of ADV logs,
grading the human driving decision in accordance with a plurality of grading metrics, and
generating a grade for the ADV driving decision that is based at least in part on the grade of the human driving decision and a comparison of the human driving decision to the ADV driving decision, wherein the grade for the ADV driving decision is utilized to modify algorithms for subsequent ADV driving.

20. The data processing system of claim 19, wherein the plurality ADV logs comprise a log of a plurality of ADV driving decisions made by a decision module of the ADV, a perception log comprising a log of a plurality of object sensor outputs, and a driving log comprising a log of a plurality of driving control inputs, wherein the plurality of driving control inputs were captured from the ADV while the ADV was driven by a user.

21. The data processing system of claim 20, wherein a driving control input of the plurality of driving control inputs comprises one of an input amount to an acceleration control, an input amount to a brake control, or an input amount to a steering control.

22. The data processing system of claim 20, wherein extracting the human driving decision corresponding to the ADV driving decision, with respect to an object, comprises one or more of:
determining a time at which the ADV decision was made;
analyzing the perception log for a time before and after the ADV driving decision; or
analyzing the driving log for a period of time before, and a period of time after, occurrence of the ADV driving decision being extracted;
wherein analyzing comprises determining a relationship between one or more of the plurality of driving control inputs and a location or distance of the object with respect to the ADV.

23. The data processing system of claim 20, wherein an object sensor comprises one or more of light detection and ranging (LIDAR), radio detection and ranging (RADAR), global positioning system (GPS), or a camera, and wherein an object sensor output of the plurality of object sensor outputs comprises one or more of a distance to an object from the ADV, a speed of an object external to the ADV, a speed of the ADV, an orientation of an object external to the ADV with respect to the ADV, a direction of an object external to the ADV, a direction of the ADV, or a location of the ADV.

24. The data processing system of claim 19, wherein the ADV driving decision is specific to an object external to the ADV and the ADV driving decision comprises one of: overtake the object, yield to the object, stop the ADV at least a minimum distance from the object, or ignore the object.

25. The data processing system of claim 19, wherein a grading metric of the plurality of grading metrics comprises a safety metric, a comfort metric, a rule compliance metric, or a time efficiency metric.

26. The data processing system of claim 19, wherein grading the human driving decision comprises:
analyzing one or more driving inputs or one or more object sensor outputs that were logged after the human driving decision was logged, to determine a metric for safety, comfort, rule compliance, or time efficiency of the human driving decision.

27. The data processing system of claim 19, wherein grading the ADV driving decision comprises:
estimating one or more driving inputs or one or more object sensor outputs, after the ADV driving decision, to determine a metric for safety, comfort, rule compliance, or time efficiency of the ADV driving decision.

* * * * *